Figure 1:
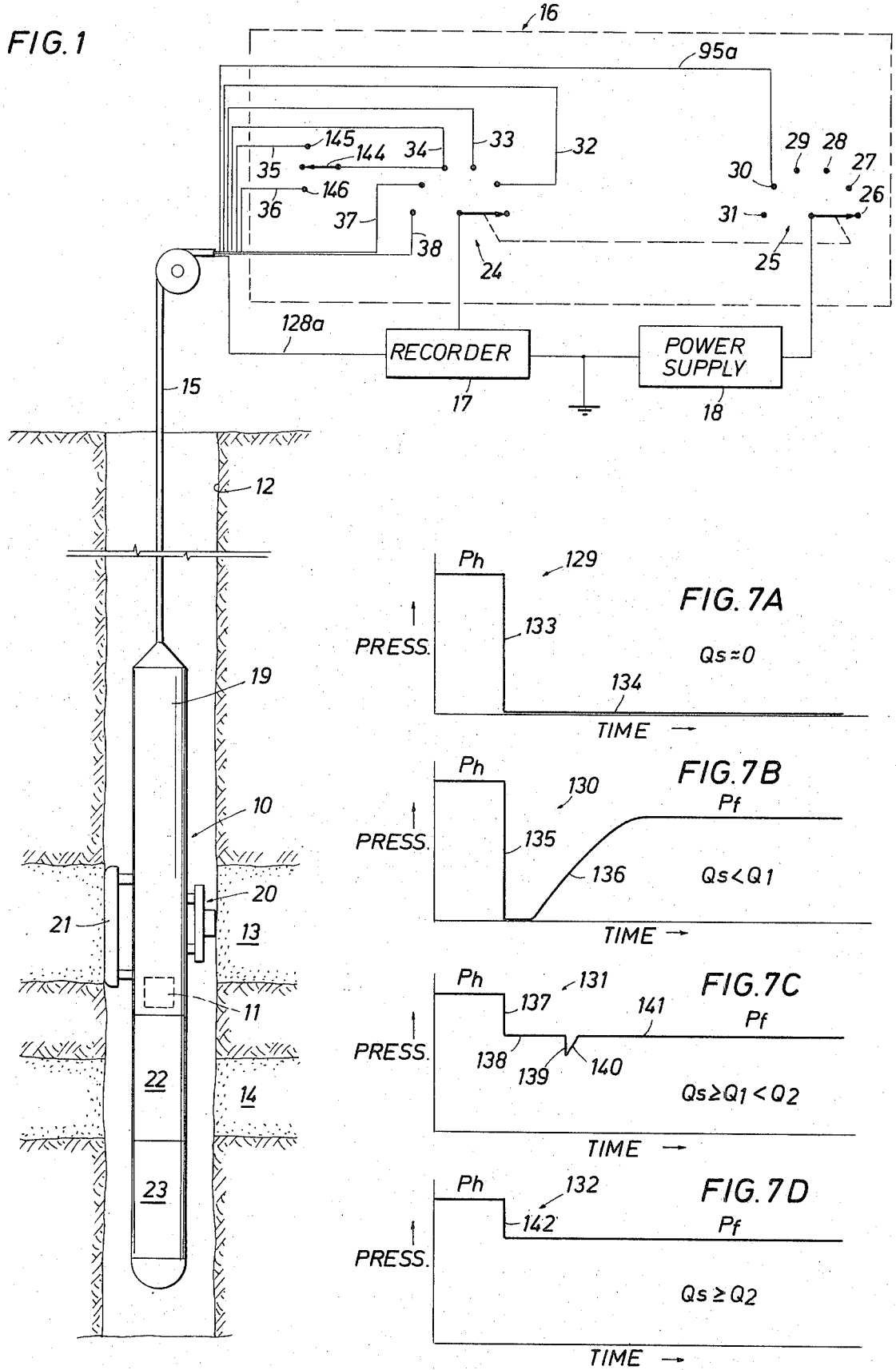

United States Patent [19]
Urbanosky

[11] 3,859,851
[45] Jan. 14, 1975

[54] METHODS AND APPARATUS FOR TESTING EARTH FORMATIONS

[75] Inventor: Harold J. Urbanosky, Pearland, Tex.

[73] Assignee: Schlumberger Technology Corporation, New York, N.Y.

[22] Filed: Dec. 12, 1973

[21] Appl. No.: 424,122

[52] U.S. Cl. .................................................. 73/155
[51] Int. Cl. ........................................... E21b 47/06
[58] Field of Search .......... 73/155, 151, 152, 421 R; 166/100

[56] References Cited
UNITED STATES PATENTS
3,611,799  10/1971  Davis .................................. 73/155
3,677,081  7/1972  Newton et al. ....................... 73/155

Primary Examiner—Jerry W. Myracle
Attorney, Agent, or Firm—Ernest R. Archambeau, Jr.; William R. Sherman; Stewart F. Moore

[57] ABSTRACT

In the representative embodiments of the new and improved methods and apparatus for testing earth formations disclosed herein, fluid-admitting means are placed into sealing engagement with a potentially-productive earth formation. A first test chamber coupled to the fluid-admitting means is then slowly expanded at a known rate of expansion to induct a minor volume of producible connate fluids, if any, from the formation into the chamber. Thereafter, a second test chamber also coupled to the fluid-admitting means is quickly expanded at a known higher expansion rate to induct a second minor volume of connate fluids into the second chamber. By monitoring the resulting fluid pressures as these first and second samples are successively inducted, reliable surface indications are quickly provided of at least the approximate flow rates at which large-volume samples can be subsequently collected from the earth formation.

34 Claims, 11 Drawing Figures $Qs \approx 0$ $Qs < Q_1$ $Qs \geq Q_1 < Q_2$ $Qs \geq Q_2$

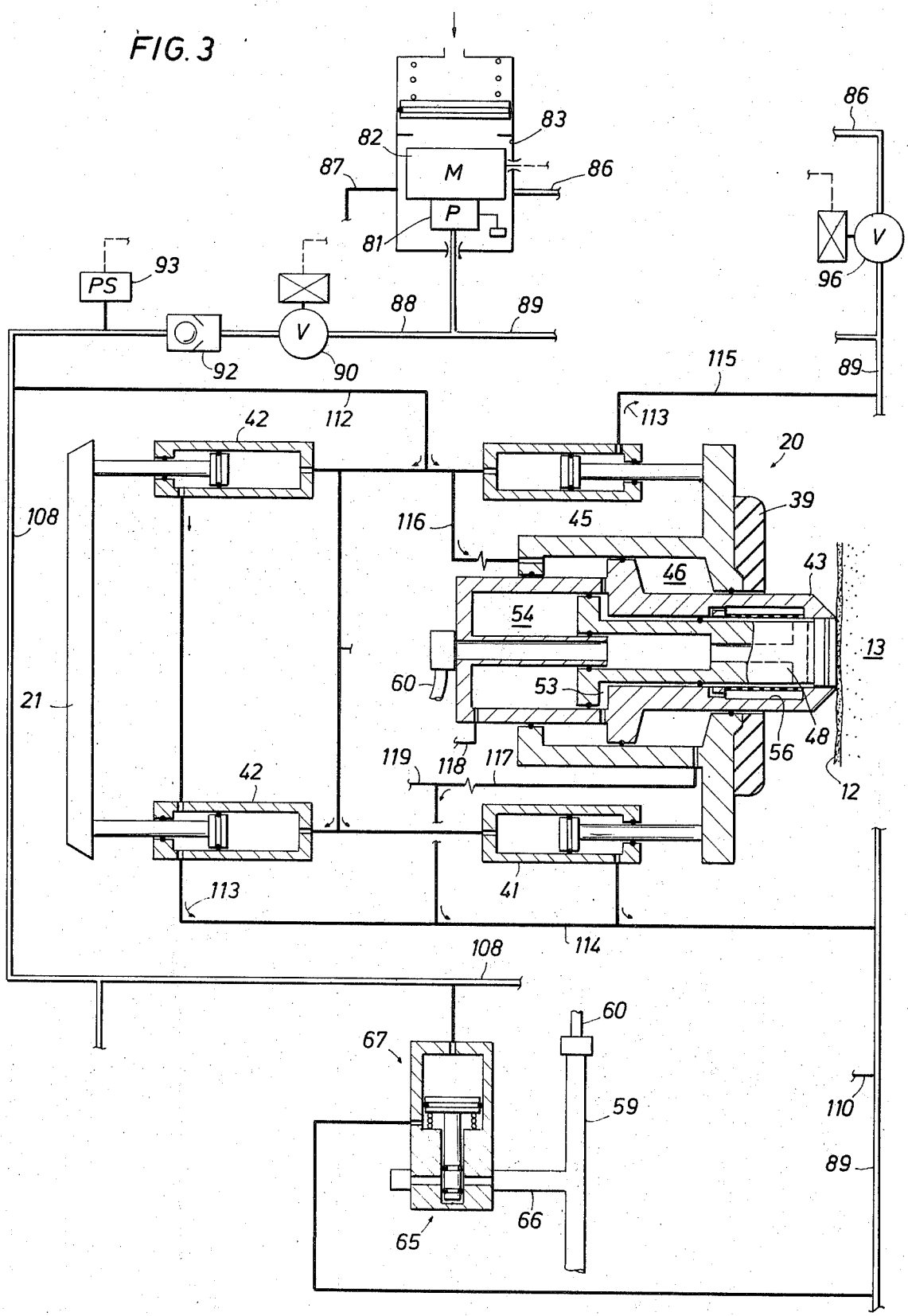

METHODS AND APPARATUS FOR TESTING EARTH FORMATIONS

One of the most successful commercial techniques for determining the production capabilities of earth formations has been to place a wireline formation-testing tool into fluid communication with a selected formation interval and, if possible, collect a representative sample of the connate fluids in that formation. During the sampling operation it is also customary to obtain one or more measurements which are at least indicative of the formation pressures in the interval being sampled.

Those skilled in the art will, of course, appreciate that many different arrangements of formation testers have been satisfactorily employed through the past several years. In general, these tools include either a fluid entry port or a tubular probe cooperatively arranged within a wall-engaging packer for isolating the port or probe from the well bore fluids during the test. To collect fluid samples, these prior-art tools have one or more sample chambers which are coupled to the fluid entry by a flow line having one or more control valves arranged therein. As shown in U.S. Pat. No. 3,011,554, for example, a suitable pressure transducer is usually arranged in the flow line for transmitting pressure measurements to the surface by way of the cable supporting the tool.

Although these pressure transducers provide some meaningful indications during the course of a typical testing operation, it is nevertheless widely recognized that these pressure measurements cannot be safely relied upon to show either that a fluid sample is actually being obtained or, if so, how fast the sample is being collected. Moreover, except for techniques such as those disclosed in U.S. Pat. No. 3,577,781, there has been no reliable arrangement heretofore that will allow an accurate prediction to be made in advance as to whether a given earth formation is even capable of being sampled at a satisfactory flow rate.

Accordingly, the usual operating practice until very recently has been to simply position a formation tester adjacent to a selected formation and begin the testing operation with the expectation that the formation is indeed worthwhile to test. Then, if the resulting pressure measurements seem to be favorable, the tool is operated to collect a sample. However, since these pressure measurements can often be misleading or false in certain situations, there is no way to know with absolute certainty whether a sample is even being obtained until a considerable time has elapsed. As a result, it is not at all uncommon for an operator to needlessly leave one of these prior-art tools in position over unduly-extended periods to hopefully obtain a sample from what is subsequently found to be a non-productive or marginal formation. This means, of course, that since most, if not all, of the commercial formation-testing tools of the prior art have been incapable of repetitive operation during a single trip into a well bore, considerable time is lost in recovering the formation tester and reconditioning it for a second trip if the first trip is unsuccessful for any reason. Moreover, there are many situations in which adverse downhole conditions may cause the tool to become stuck in the borehole if it is left in one position too long.

Those skilled in the art will recognize, therefore, that several major advances have been recently made which have solved many of the problems of this nature that were previously experienced with various prior-art formation testers. As far as the present invention is concerned, some of the more-important ones of these significant advances have been in providing new and improved techniques and apparatus for obtaining timely indications of the rate at which a large-volume fluid sample is being collected as well as for making an advance prediction of the potential commercial productivity of a given formation. For example, as described in detail in two copending applications (Ser. No. 343,082 and Ser. No. 343,083 filed Mar. 20, 1973), fairly accurate measurements representative of the rate at which a large-volume sample of connate fluids is being collected can now be made during the sampling operation.

The problem of making advance predictions of the potential productivity of a given formation before a large-volume sample is collected has, however, not been solved heretofore in a manner that is entirely satisfactory under all downhole conditions which are commonly encountered in commercial operations. For example, although the several new and improved tools disclosed in U.S. Pat. No. 3,577,781 are arranged for providing advance measurements that are at least indicative of the potential flow characteristics of a particular formation, these prior-art tools are nevertheless incapable of providing clear definitive predictions of the actual flow rates at which a meaningful large-volume sample can be collected. Thus, hereagain, there could often be situations in which a tool in accordance with U.S. Pat. No. 3,577,781 might needlessly be left in position with the false expectation that a large-volume sample could be collected in a reasonable time.

Accordingly, it will be appreciated that considerable success has been achieved with the new and improved formation-testing tools disclosed in two copending applications, Ser. Nos. 313,235 and 313,236 filed on Dec. 8, 1972, which are each incorporated by reference herein. As described at length in both of these two applications, these new and improved formation-testing tools are cooperatively arranged to be repetitively operated so that any number of tests or measurements can be obtained during a single trip into a well bore. Of more significance to the previously-discussed problem of obtaining advance predictions about the potential productivity of a given formation, these new and improved formation-testing tools also include an enclosed test chamber which is selectively expanded for initially reducing the pressure therein and then suddenly communicated with a formation to be tested for rapidly educting a small sample of producible connate fluids into the expanded chamber. As described in considerable detail in the latter of the above-specified applications, this unique operation will momentarily reduce the pressure of the inrushing fluid sample for obtaining in advance a meaningful pressure-buildup curve which is at least representative of the potential productivity of the formation under test.

Experience has shown that these new and improved formation-testing tools and techniques are highly successful in most situations. When these tools are operated in accordance with the invention described in the last-mentioned application, the operator will be provided with pressure measurements from which an advance prediction can be made as to whether it is worthwhile to subsequently collect a fluid sample from the formation under test. Then, should it be decided to collect a sample, fairly-accurate measurements can be successively obtained of the flow rate of the connate fluids entering the sample chamber by using either of the techniques described in the two first-mentioned applications.

For the large part, the utilization of the several above-mentioned inventions has been highly successful in commercial operations. It is, however, recognized that the above-discussed technique with the expansion test chamber does not always provide a reliable prediction of the potential productivity of a particular formation in all field situations. More seriously, it has also been found that under some particularly adverse downhole conditions the sudden communication of the reduced-pressure test chamber with a highly-incompetent formation may result in the rapid loss of the sealing engagement between the sealing pad and the borehole wall. For example, where there is a large pressure differential between the borehole mud and the formation fluids, the higher-pressure borehole fluids may rush between the pad and borehole wall and cause such a rapid erosion of either the mudcake layer or the formation immediately in front of the sealing pad that the desired tests cannot be completed. Other situations such as this have sometimes caused either a large cavity on the borehole wall or temporary plugging of the sample-admitting passages in the tool where large volumes of plugging materials are rapidly educted. Thus, in those limited situations where highly-adverse downhole conditions are encountered, there have been some occasions where these new and improved formation-testing tools have not been able to provide advance indications representative of the potential productivity of a given formation.

Moreover, under even ideal downhole conditions, these new and improved formation-testing tools are capable of providing only approximate indications of the relative productivity of a particular formation and there is no positive way that a quantitative measurement can be obtained for reliably predicting in advance how long it will take to collect a large-volume sample. This inability, of course, may occasionally result in a testing tool being left in position for a longer time than would otherwise be desired. As previously pointed out, this may inadvertently cause the tool to become needlessly stuck even though it is finally found that the formation being tested is not as productive as it was initially believed.

Accordingly, it is an object of the present invention to provide new and improved methods and apparatus for reliably and quickly determining in advance whether a meaningful fluid sample can be safely obtained during a formation-testing operation; and, before a large-volume sample is collected, obtaining one or more measurements at the surface which are at least fairly representative of the flow rate at which connate fluids can be expected to enter the tool.

This and other objects of the present invention are attained by successively inducting multiple minor samples of connate fluids into a formation-testing tool having fluid-collecting means including two or more initially-empty selectively-expansible sample chambers which are sequentially operated to induct the fluid samples. By sequentially operating the sample chambers to successively induct these samples at different predetermined flow rates, the resulting fluid pressures will momentarily respond in accordance with the actual rates at which the connate fluids are entering the formation-testing tool. By observing the resulting pressure measurements, an advance prediction can be reliably made at the surface of at least the approximate rate at which large-volume samples of the connate fluids can be subsequently collected.

Figure 2A:
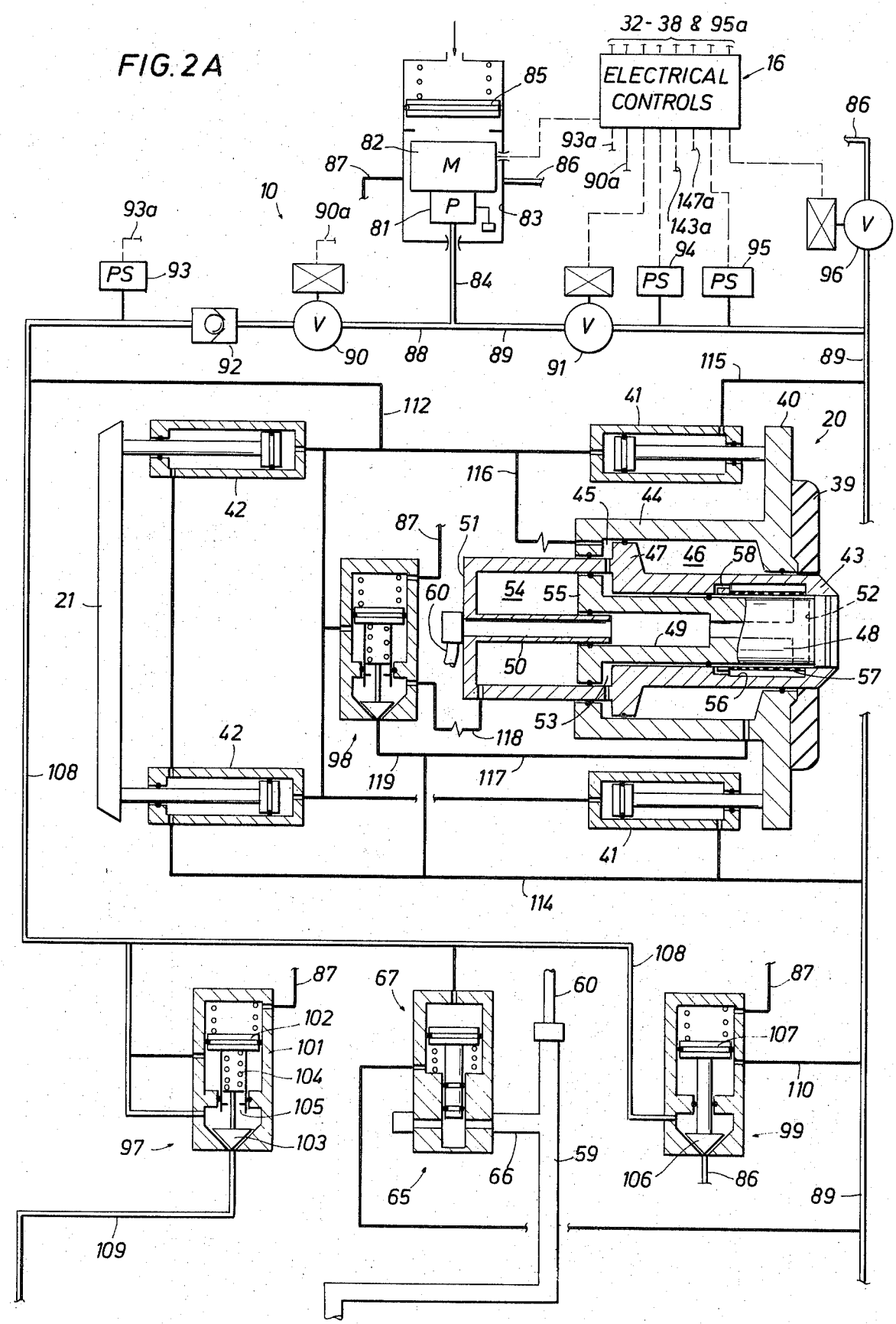
Figure 2B:
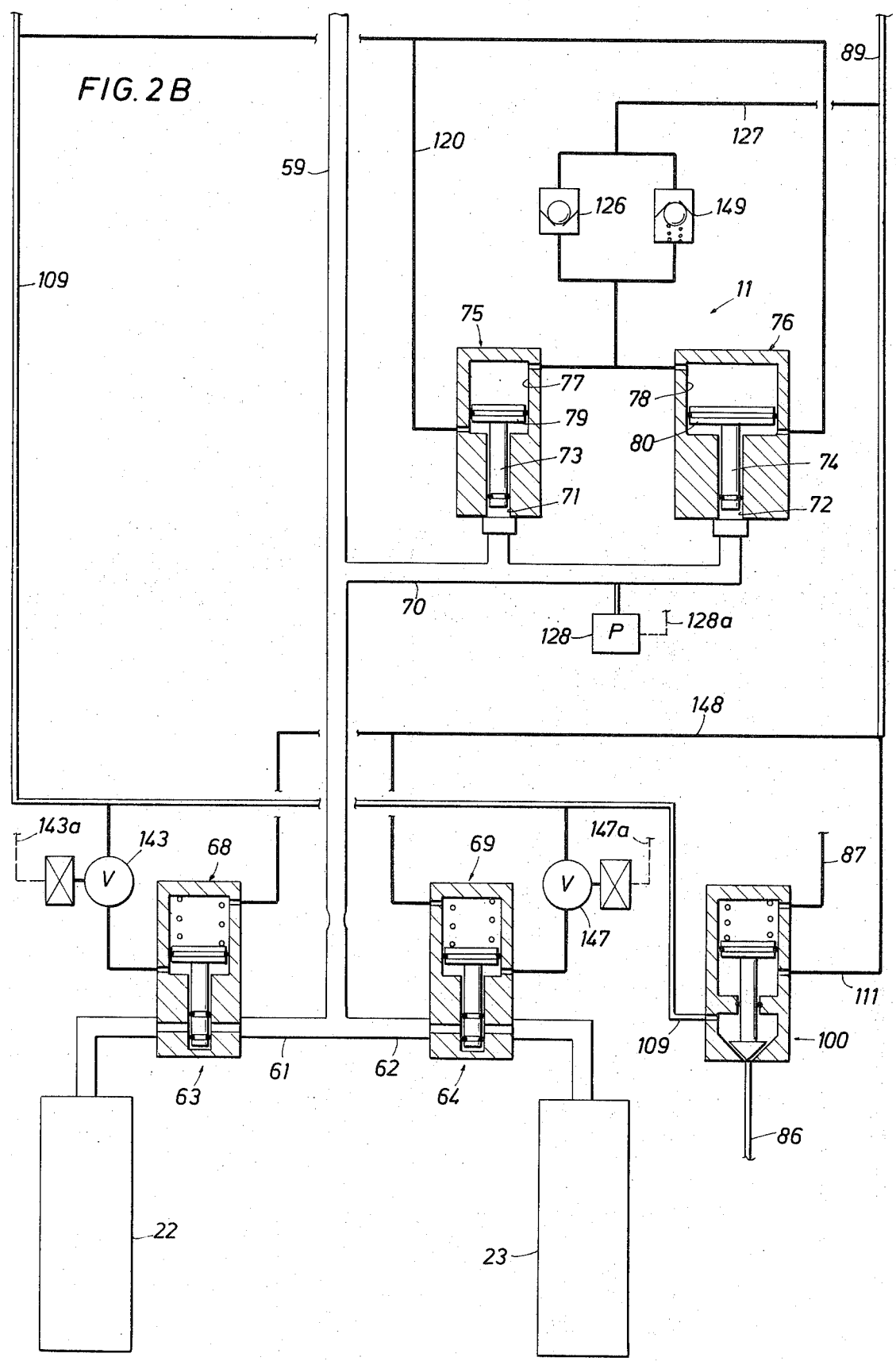

The novel features of the present invention are set forth with particularity in the appended claims. The invention, together with further objects and advantages thereof, may be best understood by way of the following description of exemplary apparatus and methods employing the principles of the invention as illustrated in the accompanying drawings, in which:

FIG. 1 depicts the surface and downhole portions of a preferred embodiment of new and improved formation-testing apparatus incorporating the principles of the present invention as it will appear while practicing the methods of the invention;

FIGS. 2A and 2B together show a somewhat-schematic representation of the formation-testing tool illustrated in FIG. 1 as this new and improved tool will appear in its initial operating position in readiness for practicing the new and improved methods of the invention;

FIGS. 3–6 respectively depict the successive positions of various components of the testing tool shown in FIGS. 2A and 2B during the course of a typical testing and sampling operation to illustrate the new and improved methods as well as the operation of the productivity-testing means of the present invention; and FIGS. 7A–7D schematically illustrate the practice of the methods of the present invention by the new and improved productivity-testing means with different types of earth formations.

Turning now to FIG. 1, a preferred embodiment of a formation-testing tool 10 provided with new and improved productivity-testing means 11 of the present invention is shown as this tool will appear during the course of a typical measuring and sampling operation in a well bore such as a borehole 12 penetrating one or more earth formations as at 13 and 14. As illustrated, the tool 10 is suspended in the borehole 12 from the lower end of a typical multiconductor cable 15 that is spooled in the usual fashion on a suitable winch (not shown) at the surface and coupled to the surface portion of a tool-control system 16 as well as typical pressure-measuring apparatus 17 and a power supply 18. In its preferred embodiment, the tool 10 includes an elongated body 19 which encloses the downhole portion of the tool-control system 16 and carries a selectively-extendible fluid-admitting assembly 20 and a selectively-extendible tool-anchoring member 21 which are respectively arranged on opposite sides of the body as well as one or more fluid-collecting chambers 22 and 23 which are tandemly coupled to the lower end of the tool body.

As is explained in greater detail in the aforementioned copending application, Ser. No. 313,235, the depicted formation-testing tool 10 and its control system 16 are cooperatively arranged so that, upon command from the surface, the tool can be selectively placed in any one or more of the five selected operating positions including those used in practicing the productivity-testing methods of the present invention. As will be subsequently described, the control system 16 will function either to successively place the tool 10 in one or more of these positions or else to selectively cycle the tool between various ones of these operating positions. These five operating positions are conveniently achieved by selectively moving suitable control switches, as schematically represented at 24 and 25, included in the surface portion of the control system 16 to various switching positions, as at 26–31, so as to selectively apply power to different conductors 32–38 in the cable 15.

The fluid-admitting assembly shown generally at 20 in FIG. 1 is cooperatively equipped for selectively sealing-off or isolating selected portions of the wall of the borehole 12; and, once a selected portion of the borehole wall is packed-off or isolated from the borehole fluids, establishing pressure or fluid communication with the adjacent earth formation, as at 13. In the particular embodiment of the tool 10 depicted in FIGS. 2A and 2B, the fluid-admitting assembly 20 includes an elastomeric annular sealing pad 39 mounted on the forward face of an upright support plate 40 that is coupled to a longitudinally-spaced pair of laterally-movable piston actuators, as at 41, which are arranged transversely on the tool body 19 for moving the sealing pad back and forth in relation to the forward side of the tool body. Similarly, the tool-anchoring member 21 is also coupled to a longitudinally-spaced pair of laterally-movable piston actuators, as at 42, which are arranged in the same manner as the piston actuators 41 for carrying the tool-anchoring member back and forth in relation to the rearward side of the tool body 19. Accordingly, as the control system 16 selectively supplies a pressured hydraulic fluid to the piston actuators 41 and 42, the tool anchor 21 and the sealing pad 39 will each be moved laterally between a retracted position adjacent to their respective side of the tool body 19 and an advanced or extended position.

By situating the sealing member 39 on the opposite side of the tool body 19 from the tool-anchoring member 21, the simultaneous extension of these two wall-engaging members will, of course, be effective for urging the sealing pad into sealing engagement with the adjacent wall of the borehole 12 as well as for anchoring the tool 10. It should, however, be appreciated that the tool-anchoring member 21 would not be needed if the piston actuators 41 are capable of extending the sealing pad 39 into firm sealing engagement with one wall of the borehole 12 when the rear of the tool body 19 is securely anchored against the opposite wall of the borehole. Conversely, the piston actuators 41 could be similarly omitted where extension of the anchoring member 21 alone would be effective for moving the front side of the tool body 19 forwardly toward one wall of the borehole 12 so as to place the sealing pad 39 into firm sealing engagement therewith. However, it is preferred that both the fluid-admitting assembly 20 and the tool-anchoring member 21 be designed for simultaneous extension to enable the tool 10 to be operated in boreholes of substantial diameter.

To conduct connate fluids into the testing tool 10, the fluid-admitting assembly 20 further includes a tubular member 43 having an open forward portion coaxially disposed within the annular sealing pad 39 and a closed rear portion which is slidably mounted within a larger tubular member 44 projecting from the rear face of the support plate 40. The nose of the fluid-admitting member 43 is preferably projected slightly from the face of the sealing pad 39 so that extension of the fluid-admitting assembly 20 will engage the nose with the wall of the borehole 12 just before the sealing pad is also forced thereagainst for isolating that portion of the borehole wall as well as the nose of the fluid-admitting member from the borehole fluids. To selectively move the fluid-admitting member 43 in relation to the larger outer member 44, the tubular members are cooperatively equipped to define enclosed piston chambers 45 and 46 within the outer member and on opposite sides of an outwardly-enlarged intermediate portion 47 of the inner member which, of course, functions as a piston member. Thus, by applying an increased hydraulic pressure in the rearward chamber 45, the fluid-admitting member 43 will be moved forwardly in relation to the outer member 44 as well as to the sealing pad 39. Conversely, upon the application of an increased hydraulic pressure to the forward piston chamber 46, the fluid-admitting member 43 will be retracted in relation to the outer member 44 and the sealing pad 39.

Pressure or fluid communication with the fluid-admitting assembly 20 is preferably controlled by an elongated valve member 48 which is coaxially disposed within the fluid-admitting member 43 and cooperatively prepared for axial movement between a retracted or open position and the illustrated advanced or closed position where its forward end substantially, if not altogether, closes off the nose of the fluid-admitting member. To support the valve member 48, its rearward portion is axially hollowed, as at 49, and sealingly disposed over a small tubular member 50 projecting forwardly from the transverse wall 51 closing the rear end of the fluid-admitting member 43. The axial bore 49 is reduced and extended forwardly along the valve member 48 and terminated by one or more lateral portion 52 in the forward end of the valve member so as to define a continuous fluid passage including the internal bore of the small tubular member 50.

To selectively move the valve member 48 in relation to the fluid-admitting member 43, these members are cooperatively arranged as illustrated to define enclosed piston chambers 53 and 54 ahead of and behind the enlarged rearward end 55 of the valve member which serves as an actuating piston. Accordingly, by increasing the hydraulic pressure in the rearward piston chamber 54, the valve member 48 will be moved forwardly in relation to the fluid-admitting member 43 to its passage-closing position. Conversely, an increased hydraulic pressure in the forward piston chamber 53 will cause the valve member 48 to be moved rearwardly along its tubular support 50 in relation to the fluid-admitting member 43 to the passage-opening position of the valve member.

It will, of course, be appreciated that many earth formations, as at 13, are relatively unconsolidated and are, therefore, readily eroded by the withdrawal of connate fluids. Thus, to prevent any significant erosion of such unconsolidated formation materials, the forward portion of the fluid-admitting member 43 is provided with an internal annular space 56 which is covered by a tubular filter screen or slitted member 57. In this manner, when the valve member 48 is retracted, formation fluids will be compelled to pass through the now-exposed filter member 57, into the annular space 56; and, by way of a fluid passage 58 in the fluid-admitting member 43 and the ports 52, enter the fluid passage 49 and the tubular member 50. Thus, should loose or unconsolidated formation materials be eroded from a formation as connate fluids are withdrawn therefrom, the materials will be stopped by the exposed portion of the filter 57 ahead of the retracted valve member 48 thereby quickly forming a permeable barrier for preventing the continued erosion of loose formation materials once the valve member halts.

In FIGS. 2A and 2B, the productivity-testing means 11 of the present invention as well as the entire downhole portion of the control system 16, the fluid-admitting assembly 20, the tool-anchoring member 21, and the fluid-collecting chambers 22 and 23 are schematically illustrated with their several elements or components depicted as they will respectively be positioned when the tool 10 is fully retracted and the control switches 24 and 25 are in their first or "off" operating positions 26 (FIG. 1). Since the aforementioned copending applications fully describe the underlying principles of the control system 16 and most of the various components of the tool 10, it is believed adequate to simply cover only the major aspects of these previously-described items before describing the present invention in detail.

A sample or flow line 59 is cooperatively situated in the formation-testing tool 10 and has its upper end coupled, as by a flexible conduit or hose 60, to the rear of the tube 50 on the fluid-admitting assembly 20 and its lower end terminated in a pair of branch conduits 61 and 62 respectively coupled to the fluid-collecting chambers 22 and 23 by way of a pair of normally-closed control valves 63 and 64. It will be seen, therefore, that the valve member 48 in the fluid-admitting assembly 20 controls the communication with the upper end of the flow line 59 and that the control valves 63 and 64 control the communication with the lower end of the flow line. For reasons which will subsequently be described, a normally-open control valve 65 which is preferably similar to the normally-closed control valves 63 and 64 is cooperatively arranged in a branch conduit 66 for selectively controlling communication between the borehole fluids exterior of the tool 10 and the intermediate portion of the flow line 59 between these latter two valves and the fluid-admitting assembly 20.

As illustrated, the normally-open control valve 65 is operated by a typical pressure-responsive actuator 67 which is designed for closing the valve in response to an actuating pressure of at least a predetermined magnitude. As fully described in the aforementioned copending applications, a spring biasing the control valve 65 to its open position cooperatively establishes the magnitude of the pressure required to close the valve. The normally-closed control valves 63 and 64 are similarly equipped except that they are respectively operated by pressure-responsive actuators 68 and 69 selectively designed for opening these valves in response to a pressure of a different predetermined magnitude.

In keeping with the objects of the present invention, the new and improved productivity-testing means 11 are cooperatively arranged in the formation-testing tool 10 for selectively inducting at least two limited-volume samples of connate fluids in succession from a formation, as at 13, at different predetermined flow rates; and, as will subsequently be explained, monitoring the pressures of these samples as they are inducted for quickly obtaining at least an approximate preliminary indication of the potential productivity of the earth formation which is then being investigated. To accomplish this with the formation-testing tool 10 schematically illustrated in FIGS. 2A and 2B, a branch conduit 70 is coupled to the flow line 59 at a convenient location between the sample-chamber control valves 63 and 64 and the fluid-admitting assembly 20, with this branch conduit being terminated at the respective inlets of two fluid-expansion chambers 71 and 72 of predetermined, but minor, volumes. Reduced-diameter displacement pistons 73 and 74 are respectively mounted in the expansion chambers 71 and 72 and arranged to be selectively moved between predetermined upper and lower positions.

Although other actuating means can, of course, be designed for moving the pistons 73 and 74 at controlled rates of displacement without departing from the scope of the present invention, it is preferred to operate the displacement pistons by typical pressure-responsive piston actuators, such as shown generally at 75 and 76, which are operatively coupled to the displacement pistons respectively. As depicted schematically, these piston actuators may be conveniently provided by extending the bodies respectively defining the expansion chambers 71 and 72 and fashioning the upper portions of these bodies to respectively form piston chambers 77 and 78 of unequal sizes. Actuating pistons 79 and 80 are respectively disposed in the piston chambers 77 and 78 and operatively coupled to its associated displacement piston as at 73 and 74. Accordingly, it will be appreciated that upon application of an increased hydraulic pressure to the lower portions of the two piston chambers 77 and 78, the displacement pistons 73 and 74 will be respectively moved to their upper positions for expanding their associated displacement chambers 71 and 72. Conversely, the displacement pistons 73 and 74 will be respectively returned to their lower positions when there is an increased hydraulic pressure in the upper portions of the piston chambers 77 and 78.

As best seen in FIG. 2A, the control system 16 further includes a pump 81 that is coupled to a driving motor 82 and cooperatively arranged for pumping a suitable hydraulic fluid such as oil or the like from a reservoir 83 into a discharge or outlet line 84. For reasons which will subsequently be explained, since the displacement pistons 73 and 74 are to be controlled by the pressure-responsive piston actuators 75 and 76, the pump 81 and the motor 82 are cooperatively arranged to operate at a constant output flow rate. Since the tool 10 is to be operated at extreme depths in boreholes, as at 12, which typically contain dirty and usually corrosive fluids, the reservoir 83 is preferably arranged to totally immerse the pump 81 and the motor 82 in the clean hydraulic fluid. The reservoir 83 is also provided with a spring-biased isolating piston 85 for maintaining the hydraulic fluid at a pressure about equal to the hydrostatic pressure at whatever depth the tool is then situated as well as for accommodating volumetric changes in the hydraulic fluid which may occur under different borehole conditions. One or more inlets, as at 86 and 87, are provided for returning hydraulic fluid from the control system 16 to the reservoir 83 during the operation of the tool 10.

The fluid outlet line 84 is divided into two major branch lines which are respectively designated as the "set" line 88 and the "retract" line 89. To control the admission of hydraulic fluid to the "set" and "retract" lines 88 and 89, a pair of normally-closed solenoid-actuated valves 90 and 91 are cooperatively equipped to selectively admit hydraulic fluid to the two lines as the control switch 24 at the surface is selectively positioned; and a typical check valve 92 is situated in the "set" line downstream of the control valve 90 for preventing the reverse flow of the hydraulic fluid whenever the pressure in the "set" line is greater than that then existing in the fluid outlet line 84. Typical pressure switches 93-95 are cooperatively situated in the "set" and "retract" lines 88 and 89 for selectively starting and stopping the pump 81 as required to maintain the line pressure within predetermined operating ranges commensurate with the rating of the pump. Since the pump 81 is preferably a positive-displacement type to deliver a constant flow of fluid as well as to achieve a rapid predictable rise in the operating pressures in the system 16, each time the pump is started the control system also functions to temporarily open the control valve 91 (if it is not already open) as well as a third normally-closed solenoid-actuated valve 96 for momentarily returning hydraulic fluid directly to the reservoir. Once the motor 82 has reached operating speed, the "set" line control valve 90, the "retract" line control valve 91 and the bypass valve 96 will be selectively positioned as required for that particular operational phase of the tool 10.

Accordingly, it will be appreciated that the control system 16 cooperates for selectively supplying a constant volume of pressured hydraulic fluid to the "set" and "retract" lines 88 and 89. Since the pressure switches 93 and 94 respectively function only to limit the maximum pressures in the "set" and "retract" lines 88 and 89, the control system 16 is further designed to cooperatively supply hydraulic fluid at predetermined intermediate pressures to selected portions of the system during the several operational phases of the tool 10. Although this regulation can be accomplished in different manners, it is preferred to employ a number of pressure-actuated control valves such as that shown schematically at 97-100 in FIGS. 2A and 2B for controlling the hydraulic fluid in the control system 16. As shown in FIG. 2A, the hydraulic control valve 97, for example, includes a valve body 101 having an enlarged upper portion carrying a downwardly-biased actuating piston 102 which is slidably coupled to a valve member 103 that is itself normally urged into seating engagement by a spring 104 of selected strength.

In its non-actuated position depicted in FIG. 2A, the control valve 97 (as well as the valve 98) simply functions as a normally-closed check valve which opens only when the outlet pressure is sufficiently greater than the inlet pressure to overcome the predetermined closing force imposed by the spring 104. On the other hand, whenever the actuating piston 102 is elevated by the application of hydraulic pressure thereto, opposed shoulders, as at 105, on the valve member 103 and the piston will engage for unseating the valve member. As shown in FIGS. 2A and 2B, it will be appreciated that the control valve 99 (as well as the valve 100) is similar to the control valve 97 except that in the two first-mentioned control valves, the valve member, as at 106, is preferably rigidly coupled to its associated actuating piston, as at 107. Thus, the control valve 99 (as well as the valve 100) has no alternate checking action allowing reverse flow but is simply a normally-closed pressure-actuated valve for selectively controlling fluid communication between its inlet and outlet ports.

The "set" line 88 downstream of the check valve 92 includes a low-pressure section 108 which is coupled to the control port and fluid inlet of the hydraulic control valve 97 for selectively supplying hydraulic fluid to a high-pressure section 109 of the "set" line which is terminated at the fluid inlet of the hydraulic control valve 100. Thus, the high-pressure section 109 will be isolated from the low-pressure section 108 until the hydraulic pressure therein reaches the predetermined intermediate pressure required to open the hydraulic control valve 97 for admitting hydraulic fluid into the high-pressure line. The hydraulic control valves 99 and 100 are respectively arranged to selectively communicate the low-pressure and high-pressure sections 108 and 109 of the "set" line 88 with the fluid reservoir 83. To accomplish this, the control ports of these two valves 99 and 100 are each connected to the "retract" line 89 by suitable pressure-communicating lines 110 and 111. Thus, whenever the pressure in the "retract" line 89 successively reaches their respective predetermined actuating levels, the hydraulic control valves 99 and 100 will be selectively opened to exhaust hydraulic fluid in the two sections 108 and 109 of the "set" line 88 back to the reservoir 83 by way of the reservoir return line 86 coupled to the respective outlets of the two control valves.

As previously mentioned, in FIGS. 2A and 2B the tool 10 and the sub-surface portion of the control system 16 are depicted as their several components will appear when the tool-anchoring member 21 and the sealing pad 39 are respectively retracted against the tool body 19 to facilitate passage of the tool into the borehole 12. To prepare the tool 10 for lowering into the borehole 12, the switches 24 and 25 (FIG. 1) are moved from their first or "off" positions 26 to their second or "initialization" positions 27 to briefly start the hydraulic pump 81 (FIGS. 2A and 2B) for applying pressure to the "retract" line 89 to be certain that the pad 39 and the tool-anchoring member 21 are fully retracted. At this time, the pressure-equalizing valve 65 is still open and that portion of the flow line 59 between the closed sample-chamber control valves 63 and 64 and the fluid-admitting assembly 20 will be filled with borehole fluids as the tool 10 is being lowered into the borehole 12.

When the tool 10 is at a selected operating depth, the switches 24 and 25 are advanced to their third positions 28 to restart the pump 81. Then, once the pump 81 has reached its rated operating speed, the hydraulic pressure in the output line 84 will rapidly rise to its selected maximum operating pressure as determined by the maximum or "off" setting of the pressure switch 93. As the pressure progressively rises, the control system 16 will successively function at selected intermediate pressure levels for sequentially operating the several control valves 63-65 and 97-100. It must, however, be recognized that neither the illustrated tool 10 nor the particular details of its particular operational sequence as will be subsequently described are necessarily essential either to the practice of the methods of the present invention or to the successful operation of the new and improved productivity-testing means 11. Those skilled in the art will, therefore, understand that so long as its principles are followed, the present invention can be practiced either with different types of formation-testing tools or with different arrangements of components and operating sequences of the tool 10 and the control system 16.

Turning now to FIG. 3, selected portions of the control system 16 and various components of the tool 10 are schematically represented to illustrate the operation of the illustrated embodiment of the tool and the productivity-testing means 11 at about the time that the pressure in the hydraulic output line 84 reaches its lowermost intermediate pressure level. To facilitate an understanding of the operation of the tool 10 and the control system 16 at this point in the operating cycle, only those components which are then operating are shown in FIG. 3.

At this time, since the control switch 24 (FIG. 1) is in its third position 28, the solenoid valve 90 and 96 will be open; and, since the hydraulic pressure in the "set" line 88 has not yet reached the upper pressure limit as determined by the pressure switch 93, the pump motor 82 will still be operating. Since the hydraulic control valve 97 (not shown in FIG. 3) is as yet unopened, the high-pressure section 109 of the "set" line 88 will still be isolated from the low-pressure section 108. At this time, hydraulic fluid in the low-pressure section 108 will be supplied by way of branch conduits, as at 112, to the rearward chambers of the actuators 41 and 42. Simultaneously the hydraulic fluid contained in the forward pressure chambers of the piston actuators 41 and 42 will be displaced (as shown by the arrows as at 113) through appropriately-arranged conduits, as at 114 and 115, to the "retract" line 89 and return to the reservoir 83 by way of the open solenoid valve 96 and the return line 86 (the solenoid valve 91 being closed). These actions will, of course, cause the tool-anchoring member 21 as well as the sealing pad 39 to be respectively extended in opposite lateral directions until each has moved into firm engagement with the opposite sides of the borehole 12. It should also be noted that at the same time, the hydraulic pressure in the low-pressure section 108 of the "set" line 88 is applied to the actuator 67 so that the normally-open pressure-equalizing valve 65 will now be closed at this point in the operating cycle.

It will be noticed in FIG. 3 that hydraulic fluid in the low-pressure line 108 will be admitted at this time by way of a branch hydraulic line 116 to the enclosed annular chamber 45 at the rear of the enlarged-diameter portion 47 of the fluid-admitting member 43. At the same time, hydraulic fluid will be discharged from the forward chamber 46 by way of branch hydraulic lines 117 and 114 to the "retract" line 89 for progressively advancing the fluid-admitting member 43 in relation to the sealing pad 39 until its nose engages the wall of the borehole 12 and then halts as illustrated. Once this occurs, the sealing pad 39 then moves forwardly in relation to the now-halted tubular member 43 for packing-off the isolated wall portion of the borehole 12 from the borehole fluids. In this manner, mudcake on the wall of the borehole 12 will be displaced radially away from the nose of the fluid-admitting member 43 so as to minimize the quantity of unwanted mudcake which will subsequently enter the fluid-admitting assembly 20.

Figure 4:
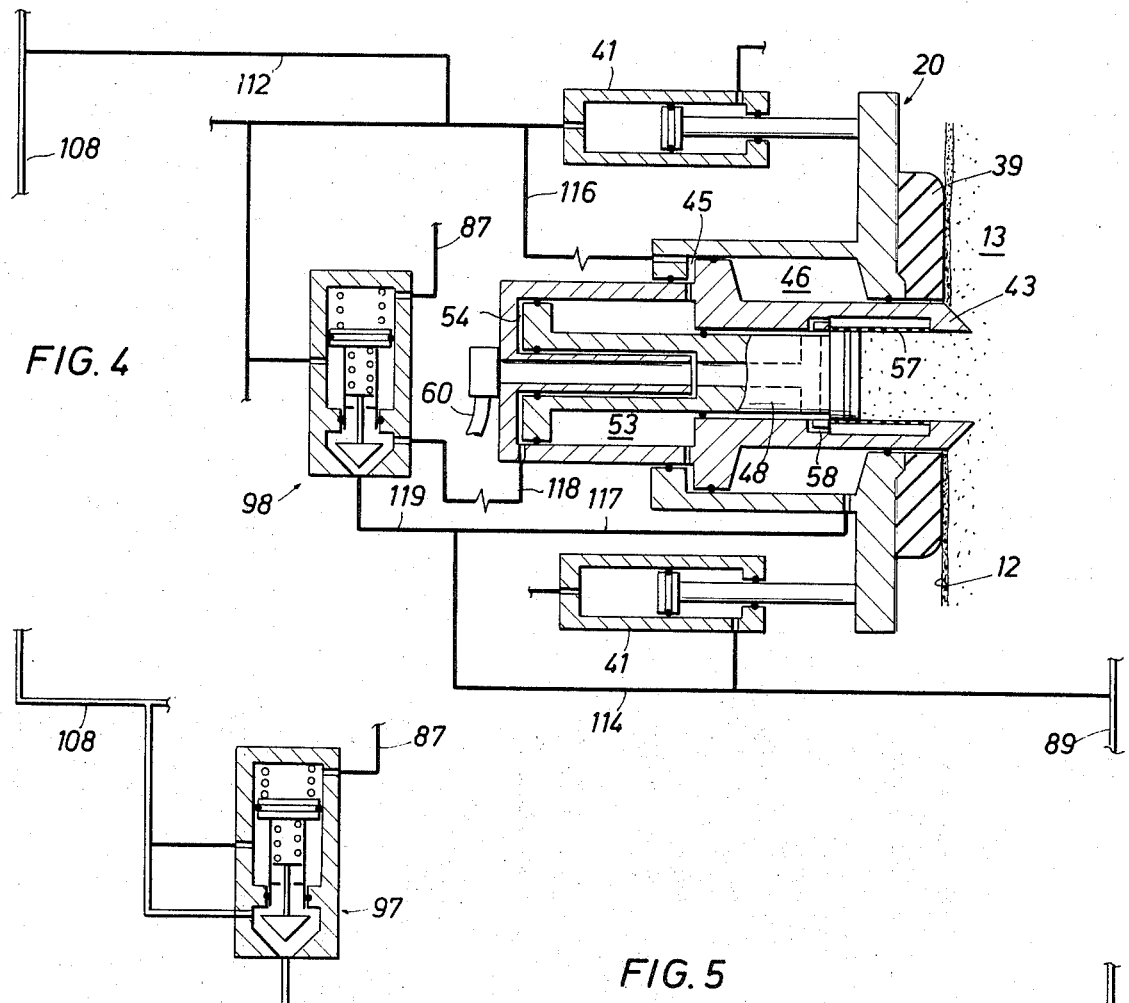

It should also be noted that although the pressured hydraulic fluid is also admitted at this time into the forward chamber 53 ahead of the piston member 55, the valve member 48 is initially prevented from moving rearwardly in relation to the inner and outer tubular members 43 and 44 inasmuch as the hydraulic control valve 98 (not shown in FIG. 3) is preferably still closed thereby temporarily trapping the hydraulic fluid in the rearward piston chamber 54. The purpose of this delay in the retraction of the valve member 48 will be subsequently explained Once the tool-anchoring member 21, the sealing pad 39, the fluid-admitting member 43 and the pressure-equalizing valve 65 have respectively reached their above-described positions, it will be appreciated that the hydraulic pressure delivered by the pump 81 will again rise. Then, once the pressure in the output line 84 has reached its second intermediate level of operating pressure, the hydraulic control valve 98 will open in response to this predetermined pressure level to now discharge the hydraulic fluid previously trapped in the piston chamber 54 to the rear of the valve member 48 back to the reservoir 83. Thus, as illustrated in FIG. 4, once the hydraulic control valve 98 opens, the hydraulic fluid will be displaced from the rearward piston chamber 54 by way of branch hydraulic lines 118, 119 and 114 to the "retract" line 89 as pressured hydraulic fluid from the "set" line 88 enters the piston chamber 53 ahead of the enlarged-diameter portion 55 of the valve member 48. This will, of course, cooperate to carry the valve member 48 rearwardly in relation to the now-halted fluid-admitting member 43 for establishing fluid or pressure communication between the isolated portion of the earth formation 13 and the flow line 59 by way of the filter member 57.

Figure 5:
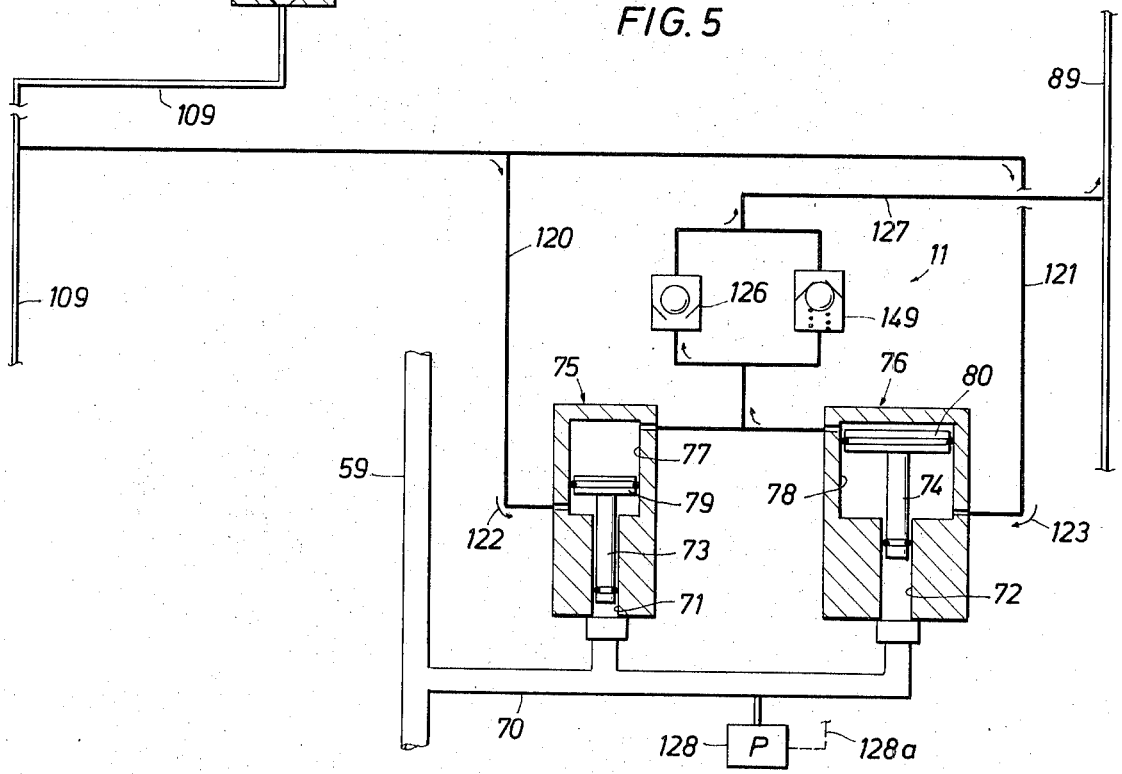

It will be appreciated that once the several components of the formation-testing tool 10 and the control system 16 have reached their respective positions as collectively depicted in FIGS. 3 and 4, the hydraulic pressure in the output line 84 will again quickly increase to its next intermediate pressure level. Once the pump 81 has increased the hydraulic pressure in the output line 84 to this next predetermined intermediate pressure level, the hydraulic control valve 97 will selectively open as depicted in FIG. 5. As seen there, opening of the hydraulic control valve 97 will be effective for now supplying hydraulic fluid from the low-pressure section 108 to the high-pressure section 109 of the "set" line 88 and two paralleled branch conduits 120 and 121 thereof which are respectively coupled to the pressure-responsive actuators 75 and 76 included in the depicted preferred embodiment of the productivity-testing means 11 of the present invention. In this manner, as respectively depicted by the several arrows at 122 and 123, hydraulic fluid at a pressure representative of this intermediate operating level will be simultaneously supplied to the lower portions of the actuators 75 and 76.

It will be understood by those skilled in the art that when hydraulic pressure is simultaneously applied to two or more paralleled hydraulic actuators, as at 75 and 76, those actuators having the pistons which are either the easiest to move or have the greater motivating forces applied thereto will move first. Then, upon movement of the first of these pistons to be moved, the other pistons will remain in position until the displacement volume created by this movement has been filled by the motivating hydraulic fluid. Once this occurs, only the next-easiest piston will then move; and, thereagain, the still-remaining pistons in the system will remain stationary. Thus, in any arrangement of paralleled hydraulic actuators, it is recognized that simultaneous application of hydraulic pressure to the actuators will result in the sequential operation of the actuators.

Figure 6:
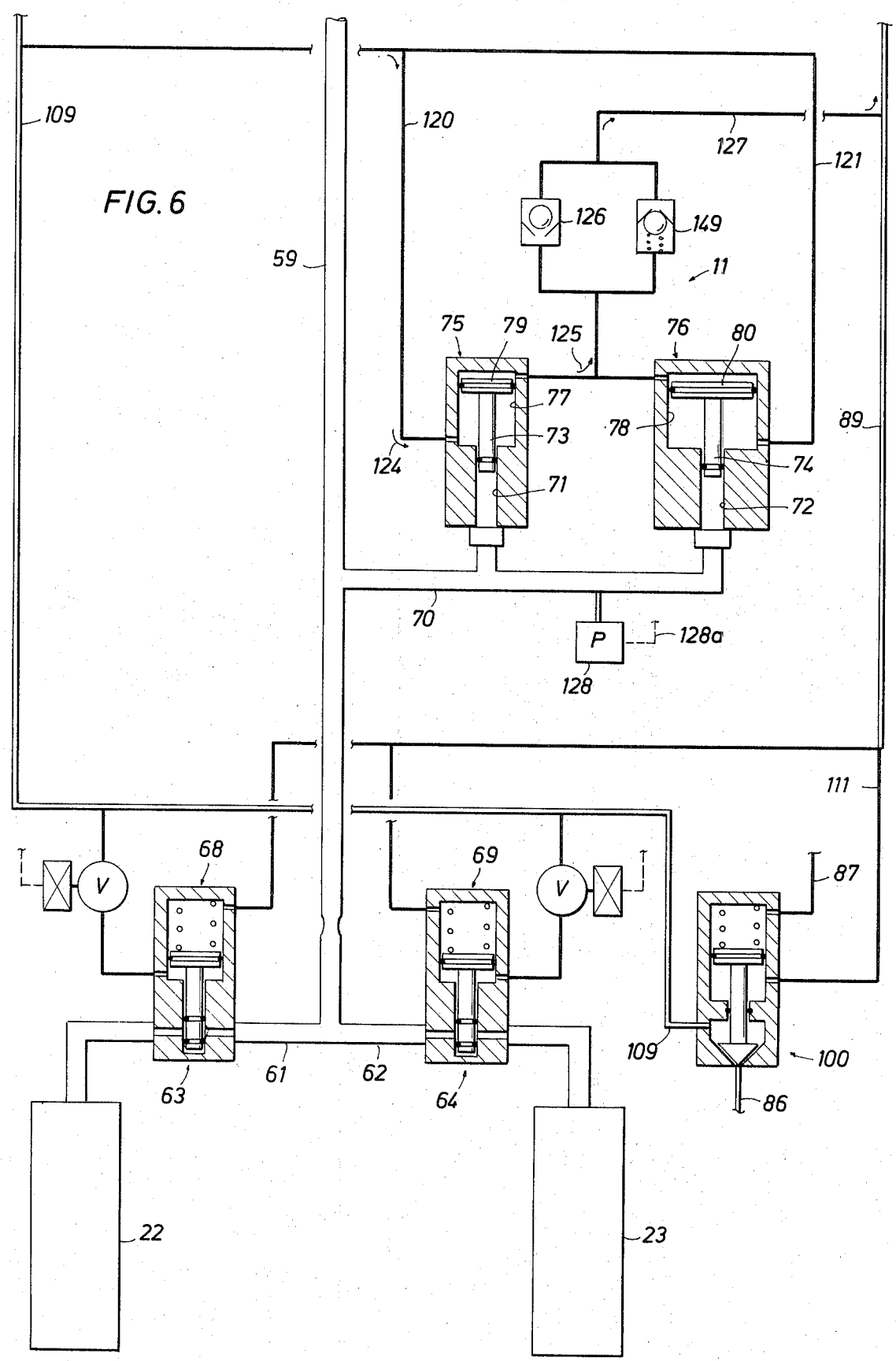

Accordingly, to take advantage of this fundamental of hydraulics when the apparatus of the present invention incorporates hydraulic actuators for selectively operating the productivity-testing means 11, the piston 80 of the actuator 76 is made at least somewhat larger than the piston 79 of the actuator 75. In this manner, in keeping with the objects of the present invention, it will be specifically assured that the displacement piston 74 will be initially operated to fully expand the expansion chamber 72 before the other displacement piston 73 is operated to subsequently expand its associated expansion chamber 71. Thus, as illustrated in FIG. 6, it is not until the first expansion chamber 72 is fully expanded that hydraulic fluid will, as shown by the arrows 124 and 125, enter the lower part of the actuator 75 as fluid is discharged from its upper portion back to the reservoir 83 by way of a typical check valve 126 in a branch conduit 127 coupled to the "retract" line 89.

It will be recalled from the previous discussion of the operation of the formation-testing tool 10 as collectively depicted in FIGS. 3 and 4 that as the productivity-testing means 11 of the present invention are being operated, the sample-chamber control valves 63 and 64 as well as the pressure-equalizing valve 65 will be closed. At the same time, the fluid-admitting valve 48 will be open to place the flow line 59 in pressure or fluid communication with the earth formation, as at 13, which is then being tested. Accordingly, in keeping with the objects of the present invention, the operation of the new and improved productivity-testing means 11 as successively illustrated in FIGS. 5 and 6 will result in the overall volume of the flow line 59 being sequentially expanded first by an amount represented by the known displacement volume of the piston 74 and then thereafter by an additional amount represented by the known displacement volume of the piston 73. For reasons which will subsequently be explained, the displacement rate of the piston 74 is preferably selected to be lower than that of the piston 73.

Those skilled in the art will understand, of course, that the above-described sequential expansions of the combined volume of the flow line 59 will be effective for correspondingly reducing the pressure of the flow line. Thus, since the fluid-admitting valve 48 is open, the formation, as at 13, being tested will be communicated with these sequential reductions in the pressure in the flow line 59. It will, however, be recognized that the ultimate pressure in the flow line 59 will be dependent upon the productivity of the formation, as at 13. Accordingly, by monitoring a pressure transducer, as at 128, arranged for sensing pressures in the flow line 59 as the tool 10 is successively operated in the several sequences shown in FIGS. 3–6, the pressure in the flow line will provide a series of meaningful measurements which will take the general form of one of the four typical pressure records 129–132 graphically depicted in FIGS. 7A–7D respectively.

It is, of course, not too uncommon for a given formation to be totally unproductive even though preliminary logging measurements may have indicated that the formation might contain connate fluids. A typical situation of this nature might arise where a formation contains connate fluids but the matrix of that formation is so impermeable that little or none of these high-pressure fluids can flow through the formation to the borehole, as at 12. Thus, in a situation of this nature, operation of the new and improved productivity-testing means 11 will initially reduce the pressure in the flow line 59 to a significantly lower pressure, as at 133 in FIG. 7A. Then, since no connate fluids will be capable of entering the isolated flow line 59, the flow-line pressure will simply remain at this lower pressure level, as at 134.

Figure 7A:
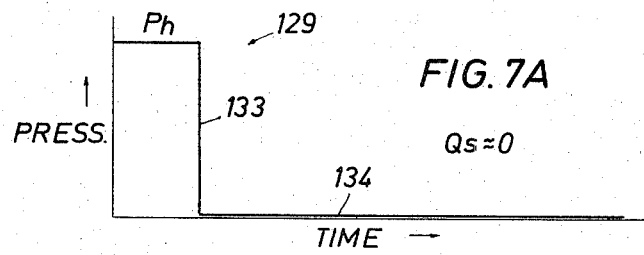

It will, of course, be recognized that the magnitude of this lower pressure level, as at 134 in FIG. 7A, will be dependent upon the relationship of the total volume of the flow line 59 to the displacement volumes of the two displacement pistons 73 and 74. Thus, in the preferred embodiment of the productivity-testing means 11 of the present invention, it is preferred to make the displacement volumes of each of the displacement pistons 73 and 74 at least about equal to the combined volumes of the flow line 59 above the sample-chamber control valves 63 and 64, the hose 60, and the several passages in the fluid-admitting assembly 20. In this manner, the operation of the productivity-testing means 11 can achieve a reduction in the pressure in the flow line to, for example, about one-third of the initial flow-line pressure. The absolute numerical magnitude of this pressure reduction is, of course, not critical as far as the success of the methods and apparatus of the present invention is concerned so long as the pressure transducer 128 is capable of providing unequivocable measurements to produce a meaningful record such as that shown at 129 in FIG. 7A.

A second common situation often experienced in typical field operations is where a particular formation is only marginally productive. That is to say, although a formation of this nature is capable of slowly producing connate fluids, the formation conditions are nevertheless so adverse that only a very-limited flow of connate fluids will occur under even a substantial drawdown or pressure reduction. It will be recognized, of course, that it may well be uneconomical to complete a formation of such unattractive potential. Thus, it is clearly of benefit to know this as soon as possible. It is, of course, also important to the successful operation of the tool 10 that the tool is not needlessly left in one position for prolonged sample-collecting operations when the ultimate conclusion will be that a given formation is of little or no commercial interest.

Accordingly, as another aspect of the present invention, the displacement pistons 73 and 74 are each moved to their respective volume-expanding positions at predetermined constant speeds. As previously mentioned, this constant speed of actuation of the displacement pistons 73 and 74 can be accomplished in different manners. However, in the preferred embodiment of the new and improved tool 10, the constant output flow rate of the pump 81 assures that the actuators 75 and 76 will respectively move the pistons 73 and 74 at selected constant speeds which are each related to the effective size of their associated actuator.

Thus, since it will be known that the pistons 73 and 74 are each capable of inducting a known volume of connate fluids at a predetermined flow rate, it can be demonstrated that the resulting pressure variations as the connate fluids initially enter the flow line 59 will be directly related to the capability of these fluids to be produced from the formation which is then being tested. As discussed by reference to FIG. 7A, the induction of no connate fluids upon actuation of the new and improved productivity-testing means 11 will be reliably reflected by the maintenance of a reduced flow-line pressure, as at 134, at the conclusion of the productivity-testing operation. On the other hand, if there is only a negligible induction of connate fluids into the flow line 59 upon operation of the productivity-testing means 11, the flow line pressure will momentarily drop if the connate fluids cannot enter the flow line as fast as the chambers 71 and 72 are successively expanded.

Figure 7B:
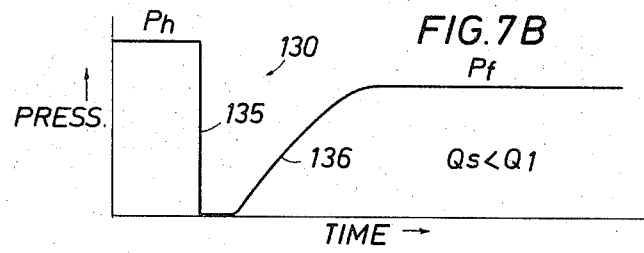
Figure 7C:
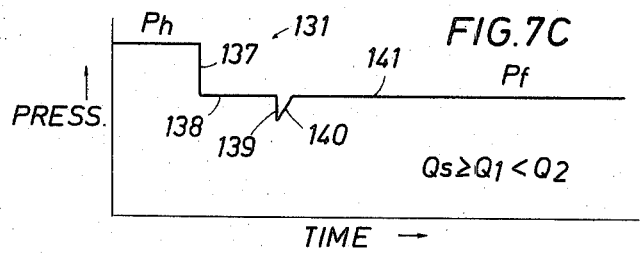

Accordingly, as graphically represented at 130 in FIG. 7B, upon actuation of the productivity-testing means 11 the pressure in the flow line 59 will momentarily drop, as shown at 135, to an initial level which may even be as low as where the formation being investigated is wholly unproductive. However, as the displacement pistons 73 and 74 are moved to their respective chamber-expanding positions, connate fluids will be slowly inducted into the flow line 59; and, once it and the now-expanded chambers 71 and 72 are filled, the flow-line pressure will slowly rise such as graphically shown at 136 on the pressure record 130 until the pressure is equal to the pressure of the formation ($P_f$) being tested. This resulting pressure reduction and subsequent buildup clearly indicates, therefore, that the connate fluids cannot flow at a rate ($Q_s$) even as low as the relatively-slow displacement rate of the piston 74 ($Q_1$). It will, of course, be appreciated that as the actual flow rate ($Q_s$) of these entering connate fluids approaches the constant displacement rate of the piston 74 ($Q_1$), the pressure reduction as graphically depicted at 135 will be less and the accompanying pressure rise, as at 136, will be quicker.

Thus, in those situations where the connate fluids can enter the flow line 59 at a rate about equal to the slower displacement rate of the piston 74, actuation of the productivity-testing means 11 of the present invention will not immediately produce a major reduction in flow-line pressure. Instead, as respectively shown at 137 and 138 on the pressure record 131 in FIG. 7C, the pressure in the flow line 59 will initially drop only to about the formation pressure, $P_f$, and remain there as the displacement piston 74 is moved to its chamber-expanding position as shown in FIG. 5. This can, of course, be readily explained when it is recognized that the connate fluids are entering the flow line 59 ($Q_s$) at least as fast as the chamber 72 is being expanded by displacement of the slower piston 74 ($Q_1$).

It will be recalled, however, that as a further aspect of the present invention, the two displacement pistons 73 and 74 are cooperatively arranged to move at different rates of chamber expansion; and that, in the preferred embodiment of the tool 10, the latter one of these two pistons moves first and at a slower rate than the former piston. Accordingly, the situation described immediately above and graphically represented at 131 will result in a pronounced decrease of the pressure in the flow line 59 once the slower piston 74 reaches its upper position as shown in FIG. 5 and the faster piston 73 is then actuated to begin moving upwardly as also shown in the drawing to its final chamber-expanding position as depicted in FIG. 6. This action of the faster piston 73, therefore, results in a momentary pressure reduction as diagrammatically shown at 139 in FIG. 7C which is immediately followed by a pressure rise, as at 140, until the formation pressure is again reached as at 141. Hereagain, these meaningful indications 137–141 on the pressure record 131 are clearly indicative of the ability of the formation fluids to enter the flow line 59 at a rate ($Q_s$) at least greater than the displacement rate of the slower piston 74 ($Q_1$) as well as of the inability of these fluids to enter the flow line at a rate faster than the displacement rate of the faster piston 73 ($Q_2$). The degree of the initial reduction of the flow-line pressure shown at 139 and the following pressure rise 140 will, of course, be proportional to the actual flow rate ($Q_s$) of the minor samples of formation fluids being inducted into the tool 10 upon operation of the productivity-testing means 11 of the present invention.

Figure 7D:
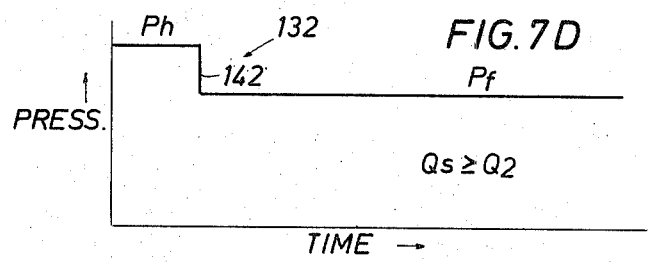

Thus, as graphically represented at 132 in FIG. 7D, where a formation under investigation is capable of producing at a greater rate or at least about equal to the predetermined displacement rate of the faster piston 73, actuation of the new and improved productivity-testing means 11 will simply result in an immediate pressure reduction, as at 142, from the initial hydrostatic pressure ($P_h$) of the fluids in the borehole 12 to the pressure of the connate fluids in the formation being investigated ($P_f$). It will, of course, be recognized that this illustrated pressure response will be obtained regardless of whether connate fluids are entering the flow line 59 at a rate equal to or greater than the displacement rate of the faster piston 73. A third and even-faster displacement piston and associated expansion chamber could, of course, be provided to determine a third flow range; but this is believed to be unnecessary in at least most formation-testing operations with the new and improved productivity-testing means 11.

Accordingly, to summarize the new and improved methods and apparatus of the present invention, the productivity-testing means 11 are preferably arranged for at least attempting to preliminarily induct successive minor-volume samples of connate fluids at progressively-faster maximum-possible flow rates from the formation which is then being tested. By monitoring the resulting momentary pressure responses in the flow line 59, a series of measurements are obtained which are representative of at least the approximate rate at which connate fluids can be produced from the formation. From these meaningful measurements, it can then be reliably predicted whether the formation being tested has sufficient potential to even warrant the collection of a large-volume sample. These predictions are, therefore, particularly worthwhile for estimating with a fair degree of accuracy how long the testing tool 10 must be left in position to collect a representative large-volume sample in one or both of the sample-collecting chambers 22 and 23. This advance knowledge will, of course, enable the operator to better evaluate the potential risks of sticking the tool 10 as well as to decide whether various preventative procedures must be initiated to at least minimize the changes that the tool will be stuck during the test.

The preceding description of the operation of the productivity-testing means 11 as shown that in the preferred practice of the present invention, the displacement pistons 73 and 74 are arranged so that the first of these pistons to be operated (i.e., the piston 74) has a lower maximum-possible displacement rate ($Q_1$) than that of the other piston ($Q_2$). It should be recognized that this preferred sequence of operation has several advantages of practical significance.

First of all, as discussed in the earlier description of the prior art, it is not at all uncommon to encounter particularly soft or incompetent formations which are easily eroded by high rates of flow. Thus, in the preferred arrangement of the productivity-testing means 11, the displacement piston 74 is arranged to induct the first minor-volume sample at a very low flow rate (e.g., less than 100-cc/min.). This has the effect of limiting any erosion of formation materials as well as slowly pulling any dislodged formation materials into the space within the tubular filter 57 ahead of the valve member 48. In this manner, should this space be filled with formation materials, there can be no further erosion of formation materials since the fluid-admitting assembly 20 will have no unfilled voids for such materials to move into. Moreover, with the space within the filter member 57 filled with loosened formation materials, these materials will serve as an additional filtering medium to further guard against the entrance of more loose formation materials as the other piston 73 is operated.

The previous description of the productivity-testing means 11 also indicates that the displacement pistons 73 and 74 are actuated in rapid succession. This is, of course, preferred since the control system 16 is so arranged that the operation of the productivity-testing means 11 will require no specific action on the part of the operator other than moving the switches 24 and 25 to their respective positions. Moreover, by arranging the control system 16 as described, the tool 10 is simpler and more fool-proof than would be the case if every component thereof had to be individually operated. Thus, as will subsequently be discussed, it is not critical to the present invention that the displacement pistons 73 and 74 be operated in any particular sequence or within any particular time limit.

It must be emphasized, therefore, that the objects of the present invention are achieved by simply attempting to induct two or more successive small-volume samples of connate fluids at different maximum-possible flow rates from a formation, as at 13, which is then being tested. The maximum-possible flow rate at which each of these successive samples could be inducted must, of course, be a known or predetermined value so that the resulting pressure response following the induction of that sample will provide a characteristic indication or comparative test as to whether the actual flow rate of the sample is less than, about equal to, or greater than this predetermined maximum-possible flow rate. Moreover, by attempting to sequentially induct such samples at different maximum-possible flow rates, it will be appreciated that the actual flow rate which does result will be successively tested or compared with at least two maximum-possible flow rates of different predetermined values. In this manner, it will be known that the actual flow rate of the inducted fluid samples at least falls within one of several predetermined ranges of flow rates by the time that the productivity-testing operation of the present invention is concluded. It will also be recognized that some degree of interpolation within a given flow range can be achieved by noting the relative magnitude of the momentary pressure reductions as at 135 or 139.

As previously noted, the time at which each displacement piston 73 or 74 is actuated is independent of the time at which the other piston is actuated. This can be appreciated when it is considered that the pressure response resulting from the actuation of each piston 73 and 74 is strictly a function of the response of the formation, as at 13, being tested to the flow conditions momentarily developed by actuation of that displacement piston. Thus, the first piston 74 could just as well be actuated at some time after the tool 10 is positioned and the fluid-admitting assembly 20 and the tool-anchoring member 21 are extended. If the valve member 48 was opened well before the displacement piston 74 was actuated, the pressure in the flow line 59 would at least approach the formation pressure of the fluids in the formation 13. Then, upon actuation of the displacement piston 74, a pressure measurement would be obtained which would simply be indicative of the relationship of the actual induced flow rate ($Q_s$) to the maximum-possible flow rate of the piston ($Q_1$).

If the displacement piston 73 is not then quickly actuated following the actuation of the piston 74, the pressure in the flow line 59 would again be capable of returning to the formation pressure. Nevertheless, the actuation of the displacement piston 73 would still produce a second pressure response which would not be indicative of the relationship of the actual flow rate of the minor volume sample ($Q_s$) to the maximum-possible flow rate of the piston ($Q_2$).

It should be further noted that in addition to these productivity tests, the initial measurements provided by the pressure transducer 128 will also immediately indicate whether the sealing pad 39 has, in fact, established complete sealing engagement with the earth formation 13 inasmuch as the expected formation pressures will be recognizably lower than the hydrostatic pressure of the borehole fluids at the particular depth which the tool 10 is then situated. By the same token, a loss of sealing engagement during the course of the productivity test will be similarly indicated. This ability to determine the effectiveness of the sealing engagement will, of course, allow the operator to retract the tool-anchoring member 21 and the sealing pad 39 without having to needlessly continue the operating sequence. Accordingly, it will be recognized that when the two displacement pistons 73 and 74 have reached their respective positions shown in FIG. 6 and the several resulting pressure measurements provided by the transducer 128 have been analyzed in light of FIGS. 7A–7D, it will be immediately known whether it is even worthwhile to collect a large-volume sample of connate fluids from the formation 13.

Quickly summarizing the balance of the complete operating cycle of the tool 10 it will be appreciated that once the several components of the tool 10 and the control system 16 have moved to their respective positions shown in FIG. 6, the hydraulic pressure will again rise until such time that the "set" line pressure switch 93 operates to halt the hydraulic pump 81. Inasmuch as the pressure switch 93 has a selected operating range, in the typical situation the pump 81 will be halted shortly after the productivity-testing means 11 have completed their operation. Once the several pressure measurements have been obtained as previously described, a decision can be made whether it is advisable to obtain one or more samples of the producible connate fluids present in the earth formation 13. If such samples are not desired, the operator can simply operate the control switches 24 and 25 for retracting the tool-anchoring member 21 as well as the sealing pad 39 without further ado.

On the other hand, should a fluid sample be desired, the control switches 24 and 25 (FIG. 1) are advanced to their next or so-called "sample" positions 34 to open, for example, a solenoid valve 143 (FIG. 2B) for coupling pressured hydraulic fluid from the high-pressure section 109 of the "set" line 88 to the piston actuator 68 of the sample-chamber control valve 63. This will, of course, be effective for opening the control valve 63 to admit connate fluids through the flow line 59 and the branch conduit 61 into the sample chamber 22. If desired, a "chamber selection" switch 144 (FIG. 1) in the surface portion of the control system 16 could also be moved from its "first sample" position 145 to its so-called "second sample" position 146 (FIG. 1) to energize a solenoid valve 147 (FIG. 2B) for opening the sample-chamber control valve 64 to also admit connate fluids into the other sample chamber 23. In either case, one or more samples of the connate fluids which are present in the isolated earth formation 13 can be selectively obtained by the testing tool 10.

Upon moving the control switches 24 and 25 to their socalled "sample-trapping" positions 30, the pump 81 will again be restarted. Once the pump 81 has reached operating speed, it will commence to operate much in the same manner as previously described and the hydraulic pressure in the output line 84 will again begin rising with momentary halts at various intermediate pressure levels.

Accordingly, when the control switches 24 and 25 have been placed in their "sample trapping" positions 30 (FIG. 1), the solenoid valve 91 will open to admit hydraulic fluid into the "retract" line 89 (FIGS. 2A and 2B). By means of the electrical conductor 95a, however, the pressure switch 95 is enabled and the pressure switch 94 is disabled so that in this fifth position of the control switches 24 and 25, the maximum operating pressure which the pump 81 can initially reach is limited to the pressure at the operating level determined by the pressure switch 95. Thus, by arranging the hydraulic control valve 100 to open in response to a hydraulic pressure corresponding to this lower predetermined pressure level, hydraulic fluid in the high-pressure section 109 of the "set" line 88 will be returned to the reservoir 83 by means of the return line 86. As the hydraulic fluid in the high-pressure section 109 returns to the reservoir 83, the pressure in this portion of the "set" line 88 will be rapidly decreased to close the hydraulic control valve 97 once the pressure in the line is insufficient to hold the valve open. Once the hydraulic control valve 97 closes, the pressure remaining in the low-pressure section 108 of the "set" line 88 will remain at a reduced pressure which is nevertheless effective for retaining the tool-anchoring member 21 and the sealing pad 39 fully extended.

As hydraulic fluid is discharged from the lower portion of the piston actuator 68 by way of the still-open solenoid valve 143 and fluid from the "retract" line 89 enters the upper portion of the actuator by way of a branch line 148, the sample-chamber control valve 63 will close to trap the sample of connate fluids which is then present in the sample chamber 22. Similarly, should a fluid sample have also been collected in the other sample chamber 23, the sample-chamber control valve 64 can also be readily closed by operating the switch 144 (FIG. 1) to reopen the solenoid valve 147. Closure of the sample-chamber control valve 63 (as well as the valve 64) will, of course, be effective for trapping any fluid samples collected in one or the other or both of the sample chambers 22 and 23.

Once the sample-chamber control valve 63 (and, if necessary, the control valve 64) has been reclosed, the control swtiches 24 and 25 are moved to their next or so-called "retract" switching positions 31 for initiating the simultaneous retraction of the tool-anchoring member 21 and the sealing pad 39. In this final position 31 of the control switch 25, the pressure switch 95 is again rendered inoperative and the pressure switch 94 is enabled so as to now permit the hydraulic pump 81 to be operated at its full rated capacity for attaining hydraulic pressures greater than the first intermediate operating level in the "retract" cycle. Once the pressure switch 95 has again been disabled, the pressure switch 94 will now function to operate the pump 81 so that the pressure will then quickly rise until it reaches the next operating level where the hydraulic control valve 99 is opened.

At this point, hydraulic fluid which had been previously supplied through the "retract" line 89 and a branch hydraulic line 149 will be effective for reopening the pressure-equalizing control valve 65 to readmit borehole fluids into the flow line 59 as the hydraulic fluid displaced from the piston actuator 67 is returned to the reservoir 83 by way of the now-opened hydraulic-control valve 99 and the return line 86. Opening of the pressure-equalizing valve 65 will, of course, admit borehole fluids into the isolated space defined by the sealing pad 39 so as to equalize the pressure differential existing across the pad before it is retracted.

When the hydraulic control valve 99 opens to communicate the low-pressure section 108 of the "set" line 88 with the reservoir 83, hydraulic fluid in the "retract" line will be admitted to the "retract" sides of the several piston actuators 41 and 42. Similarly, the pressured hydraulic fluid will also be admitted into the annular space 46 in front of the enlarged-diameter piston portion 47 for retracting the fluid-admitting member 43 as well as into the annular space 54 for returning the valve member 48 to its forward position. The hydraulic fluid exhausted from the several piston actuators 41 and 42 as well as the piston chambers 45 and 53 will be returned directly to the reservoir 83 by way of the low-pressure section 108 of the "set" line 88 and the hydraulic control valve 99. This action will, of course, retract the tool-anchoring member 21 as well as the sealing pad 39 against the tool body 19 to permit the tool 10 either to be repositioned in the borehole 12 or to be returned to the surface if no further testing is desired.

It should be noted that although there is an operating pressure applied to the branch conduit 127 leading to the productivity-testing means 11 at the time that the pressure-equalizing valve 65 is reopened, a normally-closed relief valve 149 which is paralleled with the check valve 126 is temporarily held in a closed position until the increasing hydraulic pressure developed by the pump 81 exceeds the operating level used to retract the tool-anchoring member 21 and the sealing pad 39. At this point in the operating sequence of the new and improved tool 10, the displacement pistons 73 and 74 will be restored to their respective lower positions as hydraulic fluid in the lower portion of the actuators 75 and 76 returns to the reservoir 83 by way of the branch conduits 120 and 121, the hydraulic control valve 100, and the return line 86. This delay is provided to be certain that the pressure-equalizing valve 65 is reopened so as to prevent an excessive pressure buildup in the flow line 59 which would otherwise occur when the displacement pistons 73 and 74 are returned to their lower positions.

The pump 81 will, of course, continue to operate until such time that the hydraulic pressure in the output line 84 again reaches the upper limit determined by the setting of the pressure switch 94. At some convenient time thereafter, the control switches 24 and 25 are again returned to their initial or "off" positions 26 for halting further operation of the pump motor 82 as well as closing the solenoid valve 91 and reopening the solenoid valve 96 to again communicate the "retract" line 89 with the fluid reservoir 83. This completes the operating cycle of the illustrated embodiment of the tool 10.

Accordingly, it will be appreciated that the new and improved productivity-testing means 11 and method of the present invention enable a formation-testing tool, such as that shown herein at 10, to be operated for testing any type of formation which may be reasonably expected to be encountered during a formation-testing operation. By successively inducting two or more minor samples of connate fluids at predetermined and different maximum-possible flow rates, pressure measurements will be obtained which are at least predictive of the range of the flow rate at which large-volume samples of these fluids can be subsequently obtained. Thus, with the new and improved productivity-testing means and methods described herein, tests may now be conducted in various types of formations without needlessly risking the sticking of a tool or wasting time in testing a relatively-nonproductive formation.

While only one method and a particular embodiment of apparatus of the present invention have been shown and described, it is apparent that changes and modifications may be made without departing from this invention in its broader aspects; and, therefore, the aim in the appended claims is to cover all such changes and modifications as fall within the true spirit and scope of the present invention.

What is claimed is:

1. A method for investigating earth formations traversed by a well bore and comprising the steps of:
    isolating a wall surface of said well bore adjacent to an earth formation believed to contain producible connate fluids from well bore fluids;
    communicating a first expansible sample chamber with said isolated wall surface and expanding said first sample chamber at a first predetermined rate of expansion for inducting a first sample of said connate fluids from said earth formation at a first maximum-possible flow rate into said first sample chamber;
    monitoring the pressure of said first fluid sample as it is being inducted for obtaining a first pressure measurement which is indicative of the actual flow rate of said first fluid sample;
    communicating a second expansible sample chamber with said isolated wall surface and expanding said second sample chamber at a second predetermined rate of expansion different than said first predetermined expansion rate for inducting a second sample of said connate fluids from said earth formation at a second maximum-possible flow rate into said second sample chamber;
    monitoring the pressure of said second fluid sample as it is being inducted for obtaining a second pressure measurement which is indicative of the actual flow rate of said second fluid sample; and, thereafter,
    correlating said first and second pressure measurements for estimating the relationship of said actual flow rates to said maximum-possible flow rates.

2. The method of claim 1 wherein said first predetermined expansion rate is greater than said second predetermined expansion rate.

3. The method of claim 1 wherein said first predetermined expansion rate is less than said second predetermined expansion rate.

4. The method of claim 1 wherein said second sample chamber is expanded as soon as said first sample chamber is fully expanded so that said first and second pressure measurements are obtained in rapid succession.

5. The method of claim 1 further including the additional step of:
    collecting a third sample of said connate fluids after said first and second pressure measurements have been correlated.

6. A method for investigating earth formations traversed by a well bore and comprising the steps of:
    isolating a wall surface of said well bore adjacent to an earth formation believed to contain producible connate fluids from well bore fluids;
    communicating said isolated wall surface with a first chamber having a first piston arranged therein for movement between an initial position and a chamber-expanding position at a predetermined displacement rate to induct connate fluid samples at a selected first maximum-possible flow rate;
    moving said first piston to its said chamber-expanding position for inducting a first sample of connate fluids from said earth formation into said first sample chamber and simultaneously producing a first pressure reduction when the actual flow rate of said first fluid sample is less than said first maximum-possible flow rate;
    communicating said isolating wall surface with a second chamber having a second piston arranged therein for movement between an initial position and a chamber-expanding position at a predetermined displacement rate to induct connate fluid samples at a selected second maximum-possible flow rate which is different than said first maximum-possible flow rate;
    moving said second piston to its said chamber-expanding position for inducting a second sample of connate fluids from said earth formation into said second sample chamber and producing a second pressure reduction when the actual flow rate of said second fluid sample is less than said second maximum-possible flow rate; and
    measuring the pressures of said first and second fluid samples as they are respectively being inducted for estimating the relationship of said actual flow rates to said maximum-possible flow rates.

7. The method of claim 6 including the further steps of:
    after said first and second fluid samples have been inducted, communicating said isolated wall surface with an empty sample-collection chamber for obtaining a third sample of connate fluids from said earth formation.

8. The method of claim 6 wherein said first maximum-possible flow rate is greater than said second maximum-possible flow rate.

9. The method of claim 6 wherein said first maximum-possible flow rate is less than said second maximum-possible flow rate.

10. The method of claim 6 wherein said second piston is moved toward its said chamber-expanding position as soon as said first piston has reached its said chamber-expanding position for minimizing the time interval between the measurements of said fluid pressures.

11. A method for investigating earth formations traversed by a well bore and comprising the steps of:

communicating an earth formation believed to contain producible connate fluids at an elevated formation pressure with first and second expansible sample chambers adapted for expansion at different predetermined rates to respectively induct connate fluids at selected first and second maximum-possible flow rates;

sequentially expanding said first and second sample chambers at their said predetermined expansion rates for respectively inducting thereinto successive first and second samples of said connate fluids at an actual flow rate which is dependent upon the productivity characteristics of said earth formation; and monitoring the pressures of said first and second fluid samples as they are successively inducted for detecting any contemporaneous pressure reduction below said formation pressure and thereby providing at least one indication that said actual flow rate is less than said maximum-possible flow rate of whichever one of said sample chambers is then being expanded.

12. The method of claim 11 wherein said first maximum-possible flow rate is less than said second maximum-possible flow rate.

13. The method of claim 11 wherein said first maximum-possible flow rate is greater than said second maximum-possible flow rate.

14. The method of claim 11 wherein expansion of said second sample chamber is started when said first sample chamber is fully expanded for minimizing the time interval between any resulting pressure reductions.

15. The method of claim 11 wherein there is no contemporaneous pressure reduction detected thereby indicating that said actual flow rate is at least about equal to the greater of said maximum-possible flow rates, and including the following subsequent step of:

communicating said earth formation with an empty sample-collection chamber for obtaining a third sample of connate fluids from said earth formation.

16. The method of claim 11 wherein there is only one contemporaneous pressure reduction detected thereby indicating that said actual flow rate is greater than the lesser of said maximum-possible flow rates and less than the greater of said maximum-possible flow rates, and including the following subsequent step of:

communicating said earth formation with an empty sample-collection chamber for obtaining a third sample of connate fluids from said earth formation.

17. Formation-testing apparatus adapted for suspension in a well bore traversing earth formations and comprising:

a body;

fluid-admitting means on said body and adapted to be selectively engaged with a well bore wall for isolating a portion thereof from well bore fluids; and productivity-testing means including first and second expansible sample chambers coupled to said fluid-admitting means and adapted upon expansion to induct samples of connate fluids, chamber-expansion means selectively operable for sequentially expanding said sample chambers at different predetermined first and second rates of expansion for successively inducting connate fluids at first and second maximum-possible flow rates, and pressure-monitoring means adapted for detecting pressure reductions which may occur as each of said sample chambers is being expanded as characteristic indications that the actual flow rate of such sample then being inducted is less than the maximum-possible flow rate of whichever one of said expansion chambers that is then being expanded.

18. The formation-testing apparatus of claim 17 further including:

sample-collecting means coupled to said sample-admitting means and selectively operable for collecting at least one sample of connate fluids.

19. The formation-testing apparatus of claim 17 wherein said first rate of expansion is greater than said second rate of expansion.

20. The formation-testing apparatus of claim 17 wherein said first rate of expansion is less than said second rate of expansion.

21. The formation-testing apparatus of claim 17 wherein said chamber-expansion means include:

first and second piston means respectively arranged in said first and second sample chambers for movement between a initial position and a chamber-expanding position; and initial position and a chamber-expanding position; and piston-operating means coupled to said first and second piston means and cooperatively arranged for sequentially moving said first and second piston means at different predetermined displacement rates.

22. The formation-testing apparatus of claim 21 wherein said piston-operating means include:

first and second hydraulic actuators respectively coupled to said first and second piston means for moving said piston means in response to a predetermined hydraulic pressure, said first hydraulic actuator being operatively sized for moving said first piston means at a predetermined higher speed than said second piston means; and hydraulic means coupled to said first and second hydraulic actuators and selectively operable for supplying hydraulic fluid thereto at said predetermined pressure.

23. The formation-testing apparatus of claim 21 wherein said piston-operating means include:

first and second hydraulic actuators respectively coupled to said first and second piston means for moving said piston means in response to a predetermined hydraulic pressure, said first hydraulic actuator being operatively sized for moving said first piston means at a predetermined lower speed than said second piston means; and hydraulic means coupled to said first and second hydraulic actuators and selectively operable for supplying hydraulic fluid thereto at said predetermined pressure.

24. The formation-testing apparatus of claim 17 wherein said chamber-expansion means include:
first and second piston means respectively arranged in said first and second sample chambers for movement between an initial position and a chamber-expanding position; and
piston-operating means coupled to said first and second piston means and cooperatively arranged for moving said first piston means at a predetermined displacement rate and then moving said second piston means at a predetermined displacement rate less than that of said first piston means.

25. The formation-testing apparatus of claim 24 further including:
sample-collecting means coupled to said sample-admitting means and selectively operable for collecting at least one sample of connate fluids.

26. The formation-testing apparatus of claim 17 wherein said chamber-expansion means include:
first and second piston means respectively arranged in said first and second sample chambers for movement between an initial position and a chamber-expanding position; and
piston-operating means coupled to said first and second piston means and cooperatively arranged for moving said first piston means at a predetermined displacement rate and then moving said second piston means at a predetermined displacement rate greater than that of said first piston means.

27. The formation-testing apparatus of claim 26 further including:
sample-collecting means coupled to said sample-admitting means and selectively operable for collecting at least one sample of connate fluids.

28. Formation-testing apparatus adapted for suspension in a well bore traversing earth formations and comprising:
a body having a fluid conduit;
fluid-admitting means on said body coupled to said fluid conduit and adapted to be selectively engaged with a well bore wall for isolating a portion thereof from well bore fluids;
first and second sample chambers on said body having their respective fluid inlets coupled to said fluid conduit;
first sample-inducting means including a first piston member operatively arranged in said first sample chamber for movement from a normal position adjacent to said fluid inlet thereof to a selected chamber-expanding position to induct a first fluid sample of a predetermined volume, and first piston-operating means operatively coupled to said first piston member for moving said first piston member to its said chamber-expanding position at a first predetermined displacement rate;
second sample-inducting means including a second piston member operatively arranged in said second sample chamber for movement from a normal position adjacent to said fluid inlet thereof to a selected chamber-expanding position to induct a second fluid sample of a predetermined volume, and second piston-operating means operatively coupled to said second piston member for moving said second piston member to its said chamber-expanding position at a second predetermined displacement rate different than said first displacement rate after said first member has been moved to its said chamber-expanding position; and
pressure-monitoring means coupled to said fluid conduit and operatively arranged for detecting momentary pressure reductions which may occur in said fluid conduit upon movement of said first and second piston members to their said chamber-expanding positions so as to provide indications characteristic of the induction of a fluid sample at a flow rate less than the maximum-possible flow rates respectively provided by movements of each of said piston members.

29. The formation-testing apparatus of claim 28 further including:
a sample-collecting chamber cooperatively arranged on said body for receiving samples of connate fluids; and
selectively-operable means cooperatively arranged for coupling said fluid conduit to said sample-collecting chambe 30. The formation-testing apparatus of claim 28 wherein said first displacement rate is greater than said second displacement rate.

31. The formation-testing apparatus of claim 28 wherein said first displacement rate is less than said second displacement rate.

32. The formation-testing apparatus of claim 28 wherein said first and second piston-operating means respectively include first and second hydraulic piston actuators cooperatively sized so that, upon simultaneous application of a predetermined hydraulic pressure thereto, said first piston actuator will operate in advance of said second piston actuator; and further including:
hydraulic pressure-developing means cooperatively coupled to said first and second hydraulic piston actuators and selectively operable upon command from the surface for supplying a hydraulic fluid at said predetermined pressure to said first and second hydraulic piston actuators.

33. The formation-testing apparatus of claim 32 wherein said first displacement rate is greater than said second displacement rate, and further including:
a sample-collecting chamber cooperatively arranged on said body for receiving samples of connate fluids; and
selectively-operable means cooperatively arranged for coupling said fluid conduit to said sample-collecting chamber.

34. The formation-testing apparatus of claim 32 wherein said first displacement rate is less than said second displacement rate, and further including:
a sample-collecting chamber cooperatively arranged on said body for receiving samples of connate fluids; and
selectively-operable means cooperatively arranged for coupling said fluid conduit to said sample-collecting chamber.

* * * * *